United States Patent [19]
Quick
[11] Patent Number: 4,943,328
[45] Date of Patent: Jul. 24, 1990

[54] METHOD AND APPARATUS FOR SELECTING WOOD STOCK TO FORM PANELS OF PREDETERMINED SIZE

[75] Inventor: Bradley S. Quick, Rhinebeck, N.Y.
[73] Assignee: James L. Taylor Manufacturing Company Inc., Poughkeepsie, N.Y.

[21] Appl. No.: 157,409
[22] Filed: Feb. 18, 1988
[51] Int. Cl.[5] .......... B65G 47/19
[52] U.S. Cl. .......... 156/64; 156/360; 156/363; 156/378; 156/379; 156/558; 209/518; 209/552; 209/590; 209/936
[58] Field of Search .......... 209/517, 518-521, 209/658, 661, 675, 679, 546, 549, 551, 552, 590, 936; 198/349, 352, 362, 363, 502.2, 447, 448, 451; 156/546, 557, 558-563, 64, 378, 379, 350, 362, 363, 360

[56] References Cited

U.S. PATENT DOCUMENTS 1,428,765 10/1922 Elmendorf .
2,526,342 10/1950 Frisch .
2,762,508 9/1956 Parton .......... 209/520
3,835,979 9/1974 Calvert et al. .......... 198/363
4,195,346 3/1980 Schröder .
4,195,737 4/1980 Rysti .......... 209/521
4,223,790 9/1980 Yoshida .......... 209/590
4,266,674 5/1981 Bell et al. .......... 209/546 X
4,457,622 7/1984 Kato et al. .......... 209/586 X
4,512,840 4/1985 Marino .
4,576,286 3/1986 Buckley .......... 209/590 X

*Primary Examiner*—David Simmons
*Attorney, Agent, or Firm*—Weingram & Zall

[57] ABSTRACT

The present invention represents a further extension of the automation of the various steps of the wood gluing process. This invention automatically selects and transmits to further work stations appropriately sized pieces of stock which, when glued together (utilizing various of the apparatus shown in the art for gluing such strips together), saves time in the formation of the end products.

13 Claims, 7 Drawing Sheets

STOP WAND
8
116
6
38
ADHESIVE COATING ROLLER
10
44
116
GATING SYSTEM (x13)
106
108
60
ELECTRIC EYE SENSOR
COMPUTER AND PNEUMATIC SUPPLY & SWITCHING
ANALOG SENSOR
SCANNING SYSTEM
50
96
52
x13
90
114
DIGITAL PROXIMITY SENSOR
LOADING CONVEYOR
48
CONTROLLER
A-WIDTH OF PANEL
B-NO. OF PANELS SELECTED
C-TOLERANCE FOR PANEL
DRIVE MOTOR
112

METHOD AND APPARATUS FOR SELECTING WOOD STOCK TO FORM PANELS OF PREDETERMINED SIZE

BACKGROUND OF THE INVENTION

1. Field of the Invention

This invention relates to the formation of panels of wood by gluing together smaller sized pieces of wood so as to utilize scrap wood materials which would otherwise be discarded and form usable panels therefrom.

2. Description of Related Art

Elmendorf, U.S. Pat. No. 1,428,765, forms sheets of wood from edge-glued wood strips using spacing grids formed by bars. Rails allow the strips to slide on the grids. The grids are used to carry edge-glued strips which are manually placed on each grid. A number of such supporting grids are shaped by stretching and compressing.

Frisch, U.S. Pat. No. 2,526,342, shows edge-bonding apparatus where glue is applied to the edges of the boards on an infeed table. The glued boards are fed into an area where a plurality of horizontal plungers apply pressure across the end of the edge-bonded boards. Upper and lower platens are provided which move into and out of engagement on the boards as same move into the pressurized area of the apparatus. The upper and lower platens apply RF energy to the wood to cure the glue in the gluing operation. FIG. 10 of this patent shows a plurality of plungers utilized in the apparatus. The plungers serve to apply pressure, uniformly to the sides of the board already selected for gluing. The plungers do not serve to advance selected boards beyond a predetermined point for further processing.

Schroeder, U.S. Pat. No. 4,195,346, shows an apparatus to sort and classify lumber utilizing a computer programmed to select certain pieces. Schroeder's system selects based on the length and quality of the lumber and develops electrical control signals from these inputs. The control signals indicative of length and quality are fed into a computer programmed to select optimal cut-off length and optimum quality and to feed these selections to cutting or sorting apparatus so that the appropriate operations can be performed on selected pieces of lumber.

The Schroeder system is designed to work in a saw-mill. Schroeder requires and relies on a visual inspection made by a human inspector who manually depresses buttons he selects based on the inspector's judgment made by viewing the boards. The boards so classified by the inspector are transferred on a sorting conveyor. Kickers are provided to knock off the boards so that they are placed in selected bins. Schroeder requires that an operator manually depress buttons indicative of criteria of wood boards which he observes from his inspection station. The computer then, based on preset criteria, compares the results of the signals generated by the depressed buttons with preset information and causes the boards to be conveyed automatically to preselected locations for further processing in the saw-mill.

Marino, U.S. Pat. No. 4,512,840, shows a machine for forming planks by gluing a number of wood fillets together. The planks are obtained from uniform sized wood fillets. Each plank is thirteen fillets wide and several meters long. Marino shows a feed station for the thirteen fillets. As the fillets are all of uniform size, Marino does not require any sizing, selection or processing based on the results of size analysis.

SUMMARY AND OBJECTS OF THE INVENTION

The present invention relates to a method and apparatus for selecting wood stock of various sizes automatically and to convey the stock to a series of locations which carry them to work areas where gluing rollers and other operations are performed to process the selected pieces of stock. Specifically, the invention employs a track section with thirteen distinct tracks having conveying means in which thirteen pieces of wood stock are positioned. The pieces of stock are of uniform length and thickness but are of unequal widths. The boards are placed in each of the tracks with their non-uniform dimension upright in the track.

The conveying means brings all of the separate wood boards up to a scanning area. The scanning area utilizes a track mounted analog proximity sensor positioned perpendicularly to the conveyor for the boards so that the proximity sensor will scan the height of each of the thirteen boards each time the scanner passes along the length of its track. The data received from the scanning sensors as to the height of the various thirteen boards is fed to a computer which computes which combination of the thirteen boards equals a predetermined size for the desired panel.

The computer then actuates a controller which, in turn, actuates selected ones of thirteen separate solenoid valves to control air to thirteen cylinders to raise or lower thirteen gates at the ends of each of the thirteen wood stock tracks. Conveyor means then conveys the selected boards to a secondary conveyor which carries them to a subsequent work area where gluing rollers and various other operations coact to further process the selected boards.

The wood gluing art is long recognized the need to automate what, for many years, has been essentially a manual operation. The field requires the cutting and sizing of strips of wood which are then glued along their edges, clamped together, the glue allowed to set, and the wooden panel, thus formed, removed for further processing. Examples of various machinery developed to automate the steps of this operation are shown in U.S. Pat. No. 4,374,165, 4,062,320, 4,489,925 and 3,771,779 and in U.S. patent application Ser. No. 846,363, filed Mar. 31, 1987, entitled Automatic Clamp Adjuster, all commonly assigned.

The present invention represents a further extension of the automation of the various steps of the wood gluing process. This invention automatically selects and transmits to further work stations appropriately sized pieces of stock which, when glued together (utilizing various of the apparatus shown in the art for gluing such strips together), saves time in the formation of the end products.

A principal object of the invention is the provision of apparatus which will automatically select the widths of the boards necessary to make up a panel of predetermined dimensions.

A further object of the present invention is to automate and make more efficient the fabrication of wood panels by gluing together pieces of wood.

Another object of the present invention is the provision of an apparatus which automatically stores a number of strips of wood having uniform length and thickness but non-uniform widths. The apparatus automatically selects the number of pieces of the widths presented to make up the desired panel width.

A further object of the present invention is the provision of an apparatus which automatically takes the selected pieces of wood and transmits them to a work station, first passing them over an edge-gluing roller.

Yet another object of the present invention is the provision of an automatic stop which acts to inhibit operation of the system until glued selected wood pieces are removed from the apparatus for further processing.

A still further object of the present invention is the provision of a computer program which processes the information preset by the operator for width of the panel to be formed, the number of pieces of wood to be selected and the tolerances for the panel to be formed.

A further object of the present invention is the implementation of an algorithm in the computer program, which algorithm develops output signals to select boards of different widths to make up a panel having preselected width, number of boards to be contained in the panel, and desired tolerance.

Another object of the present invention is the provision of a scanner apparatus for scanning the widths of the plurality of boards and developing output signals indicative of the width of the board and the location of each board scanned.

Yet another object of the present invention is the provision of scanning apparatus which employs an analog sensor for generating an electrical signal indicative of the width of the board which analog sensor operates by impinging compressional wave energy (ultrasonic signal) on the board and receiving a reflected signal therefrom.

A further object of the present invention is the employment in a scanning system of a digital location sensor which senses the position of the analog sensor by developing a signal based on selection of mechanical indicia for each channel where boards are mounted.

Another object of the present invention is the employment of a scanning system employing analog and digital sensors mounted on a rodless cylinder which serves to index the sensors across the width of the ends of the boards.

These as well as further objects and advantages of the invention will become apparent to those skilled in the art from a review of the following detailed specification and accompanying drawings.

DETAILED DESCRIPTION OF THE PREFERRED EMBODIMENT

Figure 1:
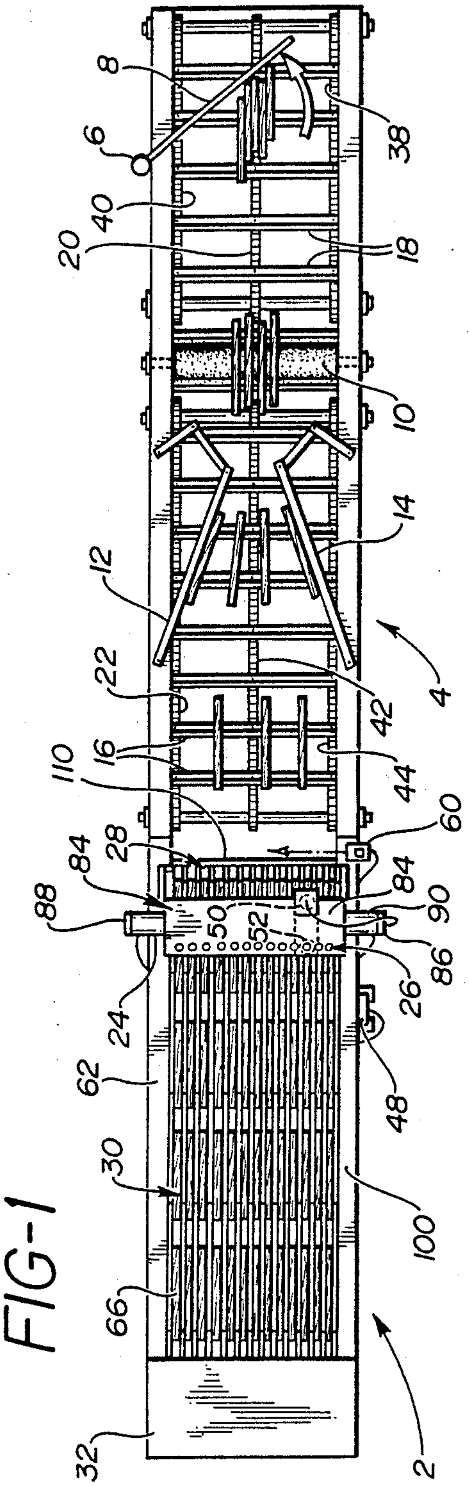
FIG. 1 is a top view of the apparatus of the invention.

FIG. 1 is a top view of the apparatus employed in the invention. FIG. 1 consists of two main sections; an infeed section 2 is provided to the left of FIG. 1 which includes infeed table surface 32. The infeed table surface 32 serves as a working surface which enables the operator to stack pieces of wood in thirteen separate tracks shown generally at 30. The operator has available to him a hand held push button controller 48. When the operator has filled the tracks 30 with pieces of wood, the operator depresses the push button on controller 48 to activate the apparatus. The thirteen tracks each may contain a number of uniform length, uniform thickness but not non-uniform width pieces of wood. These thirteen tracks extend along the length of the frames supporting infeed section 2 until they pass beneath a scanner section shown generally at 84.

Each of the thirteen tracks 30 end in respective ones of thirteen gates shown generally at 28 in FIG. 1. The gates permit a number of selected boards to pass on to the second main section of the apparatus, the output section 4.

This scanner section is followed by an outfeed section shown generally at 4. The outfeed section takes the selected boards from the gates and conveys them to a work station after passing the boards through a concentrator. The concentrator consists of rails 12 and 14 which serve to concentrate and compress the boards into a compact arrangement and may be located centrally of the outfeed section 4. The boards thus concentrated are in turn passed over the glue roller 10. Glue is applied to the boards by roller 10 on one edge thereof and are then conveyed to a wand 8 which acts as a stop wand or feeler. Wand 8 is pivoted about a spring-loaded pivot mounting 6. Movement of the wand to the position shown in FIG. 1 stops the apparatus. Release of the wand from the position shown in FIG. 1 permits the apparatus to operate. The wand 8 is caused to release from the position shown in FIG. 1 when the bundle of boards which has caused the wand to move its "off" position as shown in FIG. 1 is removed by the operator for further processing.

The outfeed section 4 of FIG. 1 includes a number of rotatable roller rails 16. These roller rails 16 are chain-driven by chains 22, 44 and 42 in FIG. 1. The set of roller rails 16 conveys the boards from the gates 28 through the concentrators 12 and 14. Another set of roller rails 18 controlled by chain drives 38, 40 and 20 take the boards from the glue roller 10 to the end of the apparatus at stop wand 8.

Figure 2:
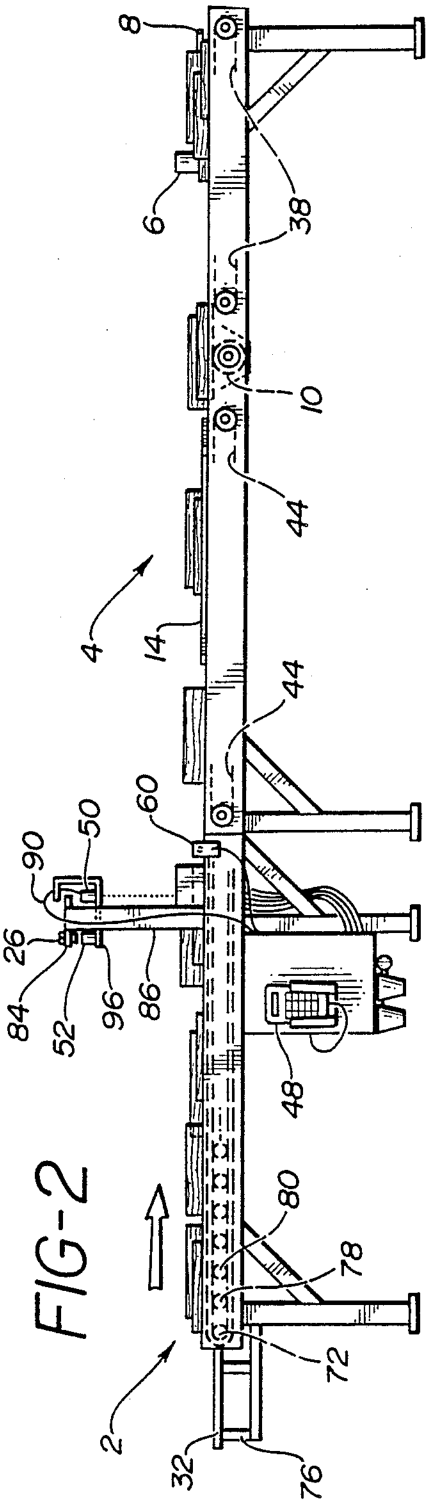
FIG. 2 is a side view of the apparatus.

As shown in FIG. 2, a side view of the apparatus of FIG. 1, infeed table surface 32 is connected to the thirteen rails in conveying section 2 of the apparatus.

FIG. 2 also shows a keyboard 48 with a liquid crystal display. The keyboard 48 is mounted on a panel adjacent the scanning section. This keyboard allows the scanning apparatus to be set with selection parameters which will be described in connection with the computer program by which the apparatus operates as further described in connection with FIGS. 9 and 10 hereof.

Figure 5:
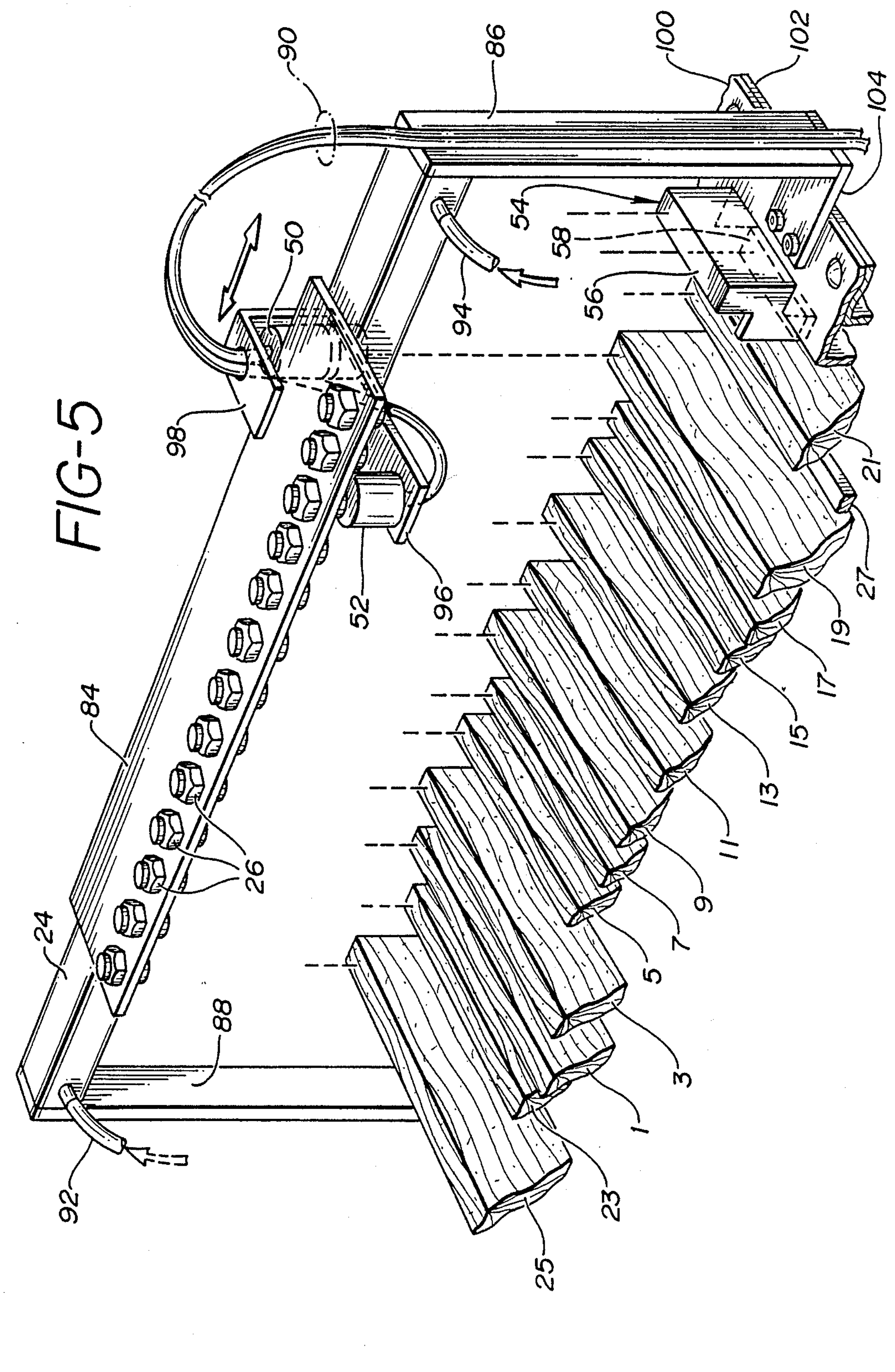
FIG. 5 is a perspective view partially in section of the scanning subsystem of FIGS. 1 and 2.

The side view of FIG. 2 also shows a plurality of sets of boards located at various points along the apparatus. Also shown in FIGS. 2 and 5 is a vertical support bar 86 which mounts the scanner section of the apparatus. The scanner section consists of an ultrasonic analog scanner 50 and a digital proximity sensor 52. Each of these scanners are mounted on a supporting bracket 96 which is, in turn, mounted to a rodless cylinder 24. As is known in the art, a rodless cylinder is an air-driven device which allows a carriage to move from one side of the apparatus to the other. This is commercially available apparatus identified as model BC100-1Px30" manufactured by Tolomatic and is employed in the present invention to move the scanners 50 and 52 across the entire width of the thirteen channels 30. The rodless cylinder is mounted on bracket supports 86 and 88. A plate 84 is mounted on the top of the rodless cylinder 24. Plate 84 has thirteen stopnuts shown generally at 26 mounted therein. The stopnuts 26 provide an indication of location by proximity to sensor 52. The analog proximity sensor 50 develops electrical signals based on ultrasonic detected signals indicative of the width (height in FIGS. 2 and 5) of each of the boards. The digital proximity sensor 52 detects which channel the analog sensor is measuring by a count of pulses indicative of sensing its proximity to the stopnuts 26. More particularly, a count from one to thirteen is developed as the proximity sensor 52 moves across the rodless cylinder 24 from one end to the other.

Figure 6:
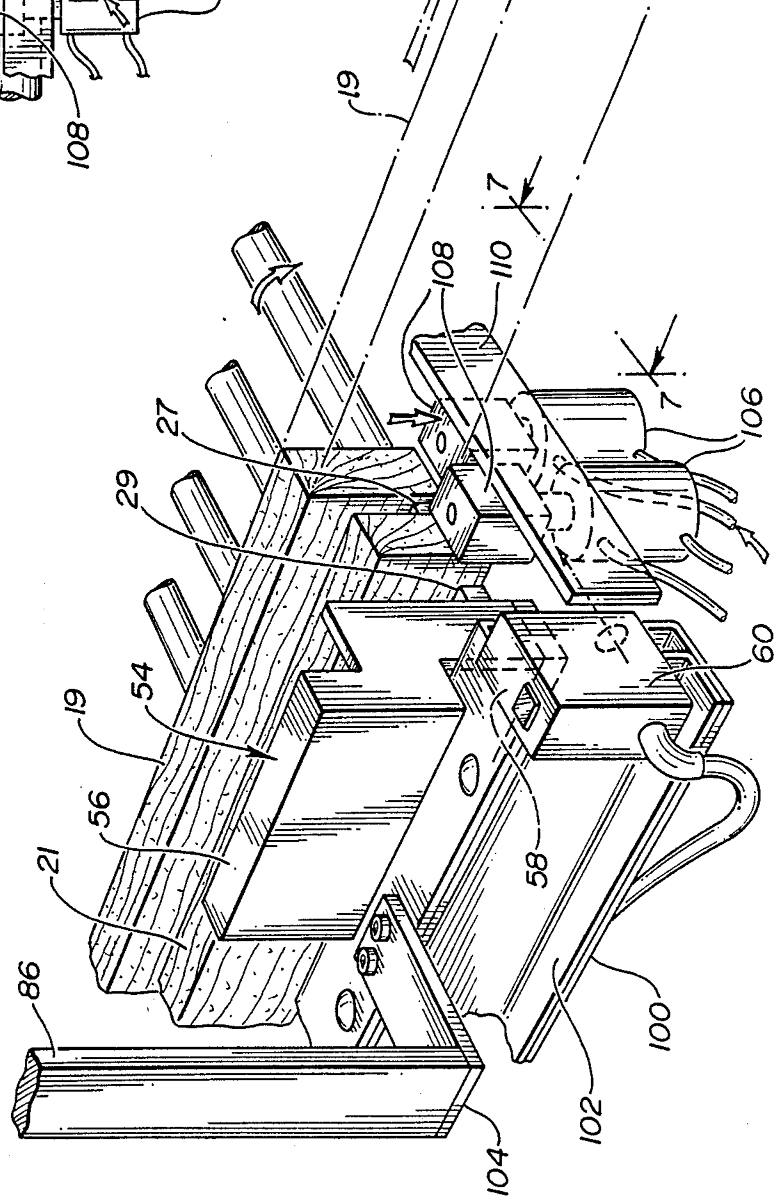
FIG. 6 is a perspective view partially in section of a portion of the gating subsystem of the invention.

As shown in FIGS. 1, 2 and 6, an electric eye circuit 60 is provided to generate a signal indicative of boards passing in the path of the electric eye 60. Numeral 90 denotes the electrical lead wire connecting the sensors 50 and 52 to the computer portion of the apparatus.

Figure 4:
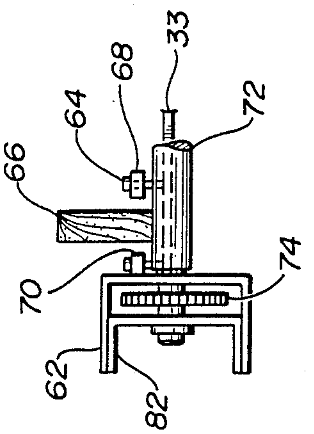
FIG. 4 is an end view of a portion of the apparatus shown in FIG. 3, taken along the line 4—4 of FIG. 3.
Figure 3:
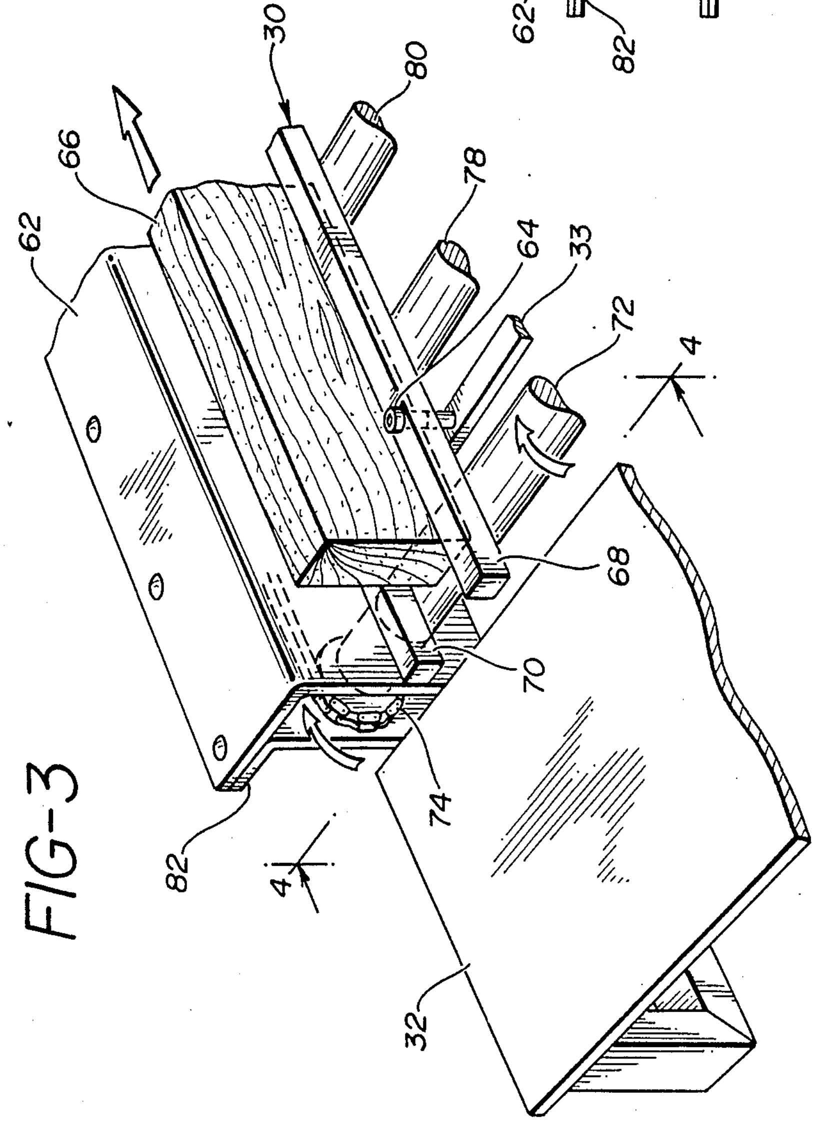
FIG. 3 is a perspective view partially in section of the infeed portion of the apparatus shown in FIGS. 1 and 2.

FIG. 3 shows the infeed section of the apparatus of FIGS. 1 and 2 in more detail. In FIG. 3, the infeed table 32 is mounted on a support bracket 76. One of the thirteen wood feeding tracks is shown in FIG. 3. This track is formed between rails 68 and 70. A piece of wood 66 is shown edge-mounted between the rails 68 and 70. The rails 68 and 70 are fastened to lateral frame supports such as 33 by a mounting fastener suitable to the materials of which the rail 68 and the support 33 is formed such as shown generally at 64. A chain drive is shown at 74 and serves to rotate roller rails such as 72, 78 and 80 to convey the wood piece 66 along the length of the infeed rail structure. As shown in FIGS. 3 and 4, the structural support is provided by two complimentary U-shaped brackets 62 and 82. These brackets serve to provide structural integrity for the infeed section as well as to provide a safe protected covered housing for the chain drive 74.

FIG. 5 shows the scanning section of the invention. As will now be seen, thirteen boards of uniform length and thickness but different widths are presented beneath the scanning section. These boards are designated by numerals 1, 3, 5, 7, 9, 11, 13, 15, 17, 19, 21, 23 and 25. The boards are located beneath the two scanners: the analog scanner 50 and the digital scanner 52. The scanners 50 and 52 are mounted on the rodless cylinder 24. The rodless cylinder is coupled to the scanners via scanner mounting bracket 98, 96. This bracket consists of U-shaped portions having a short leg 98 and a long leg 96. Proximity digital sensor 52 is mounted on leg 96 and analog sensor 50 is mounted between leg 96 and short leg 98. As is known in the art, rodless cylinder 24 is coupled to the bracket 96,98 and, under control of air lines 94 and 92, serves to slide bracket 96, 98 from one side of cylinder 24 to the other at a uniform rate. There is also mounted on rodless cylinder 24 a mounting plate 84 which contains the thirteen stopnuts shown generally at 26. It is these stopnuts that cooperate with and are sensed by the proximity sensor 52 so that actual signals indicative of the count of each stopnut from one through thirteen are developed for each scan of the sensors 52 and 50 across rodless cylinder 24. The rodless cylinder 24 is in turn mounted on the remaining apparatus by vertical supports 86 and 88. The brackets 86 and 88 are coupled to support rails 100 and 102 in FIG. 5 and 62 and 82 in FIGS. 3 and 4 (for support 88) via a bar such as 104 which is fastened to rail 100.

An important feature of the invention is shown in FIG. 5 as calibration block or gauge block 54. This gauge block contains two surfaces, a top surface 56 and a lower surface 58 located coincident with the level of the surface of the rails (one rail is shown in FIG. 5 at 27). As will be explained later, analog ultrasonic sensor 50 utilizes these surfaces as calibration surfaces for the scan so as to gauge the range of widths of the pieces of wood.

FIG. 6 shows the gauge block 54 in more detail. In FIG. 6, the gauge block is viewed from the end opposite that shown in FIG. 5 so that two of the thirteen gates are also seen in this showing. More particularly, FIG. 6 shows the mounting bracket supports 104 and 86 for the scanning section. These brackets are connected to support rails 102, 100 as discussed in connection with FIG. 5. The gauge block 54 has a top surface 56 and bottom surface 58 formed therein. Two pieces of wood 19 and 21 are shown in FIG. 6 having arrived at the end location for the infeed section of the apparatus. Electric eye 60 is mounted to support rails 102, 100.

Figure 7:
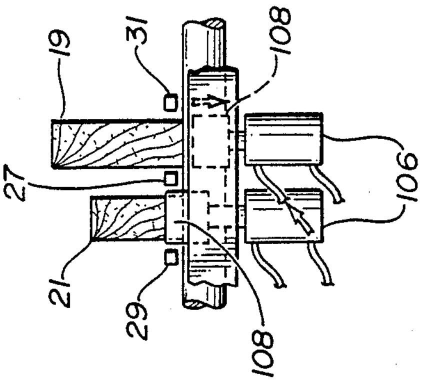
FIG. 7 is an end view taken along the line 7—7 of FIG. 6 of a portion of the gating system of the invention.

Each of the thirteen channels are controlled by gates which consist generally of a solenoid operated air cylinder 106 and a movable gate element 108 mounted to the air cylinder. When the cylinder is actuated, the element 108 is caused to drop down from the position shown in FIGS. 6 and 7 applicable to board 21 to the lower position shown in FIGS. 6 and 7 applicable to board 19. This allows the board 19 to advance to the next station. In FIGS. 6 and 7, numerals 27, 29 and 31 denote the support rails for the channels in which boards 21 and 19 are carried. The cylinders are mounted on and supported by mounting plate 110.

Figure 8:
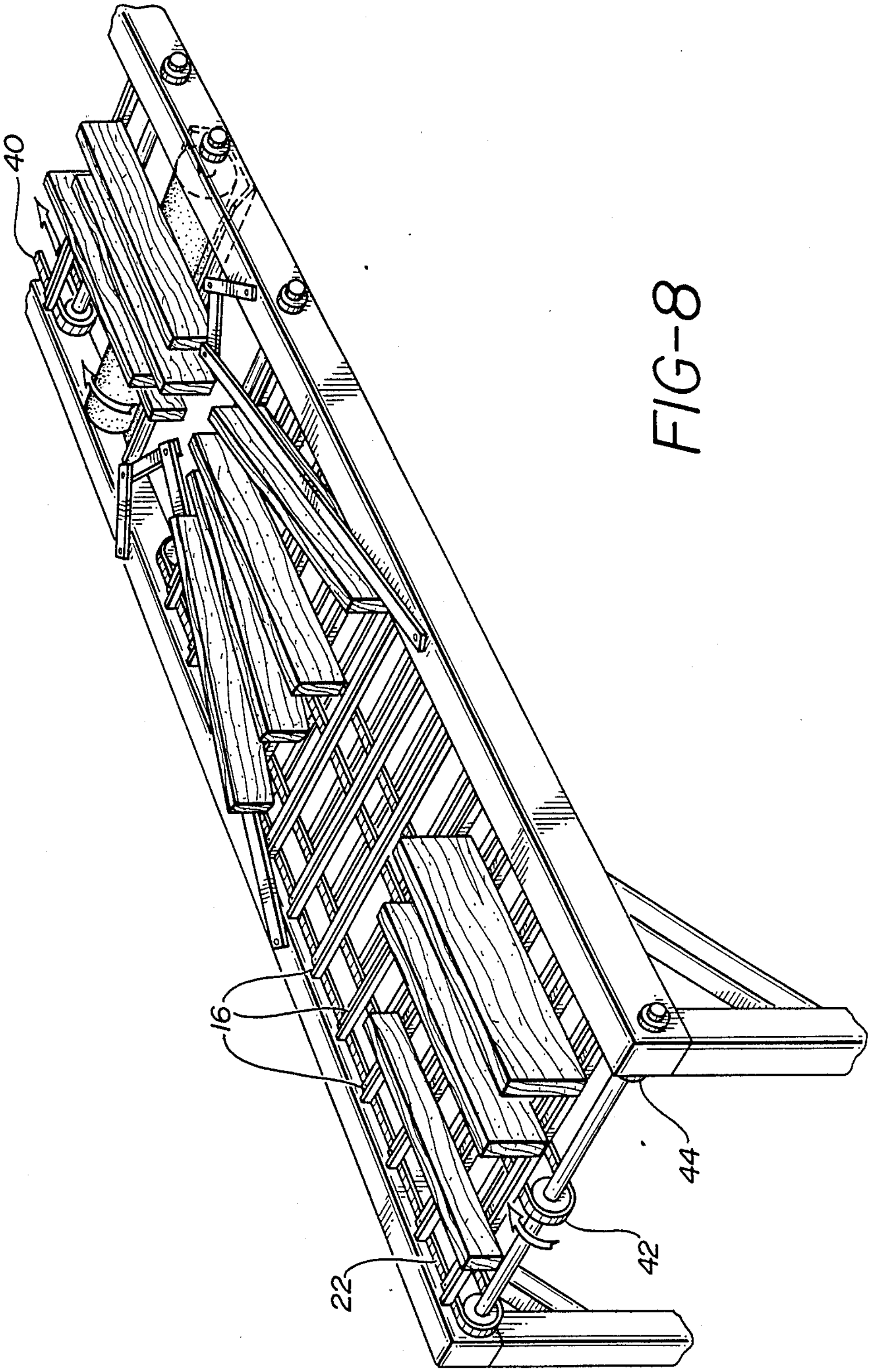
FIG. 8 is a perspective view partially in section of the outfeed apparatus of the invention.

FIG. 8 shows the outfeed portion of the apparatus. FIG. 8 shows three groups of boards progressing from the gates 108 through the glue roller 10. As shown, the boards are concentrated by two rails 12 and 14 which are mounted such that the boards are caused to move closer to each other before they pass over edge-gluing roller 10. Numeral 40 denotes one of the chain drives for the roller rails employed in the section of rails downstream of the glue roller 10 and chain drives 22, 42 and 44 operate the section of rails 16 located upstream of the glue roller 10.

Figure 9:
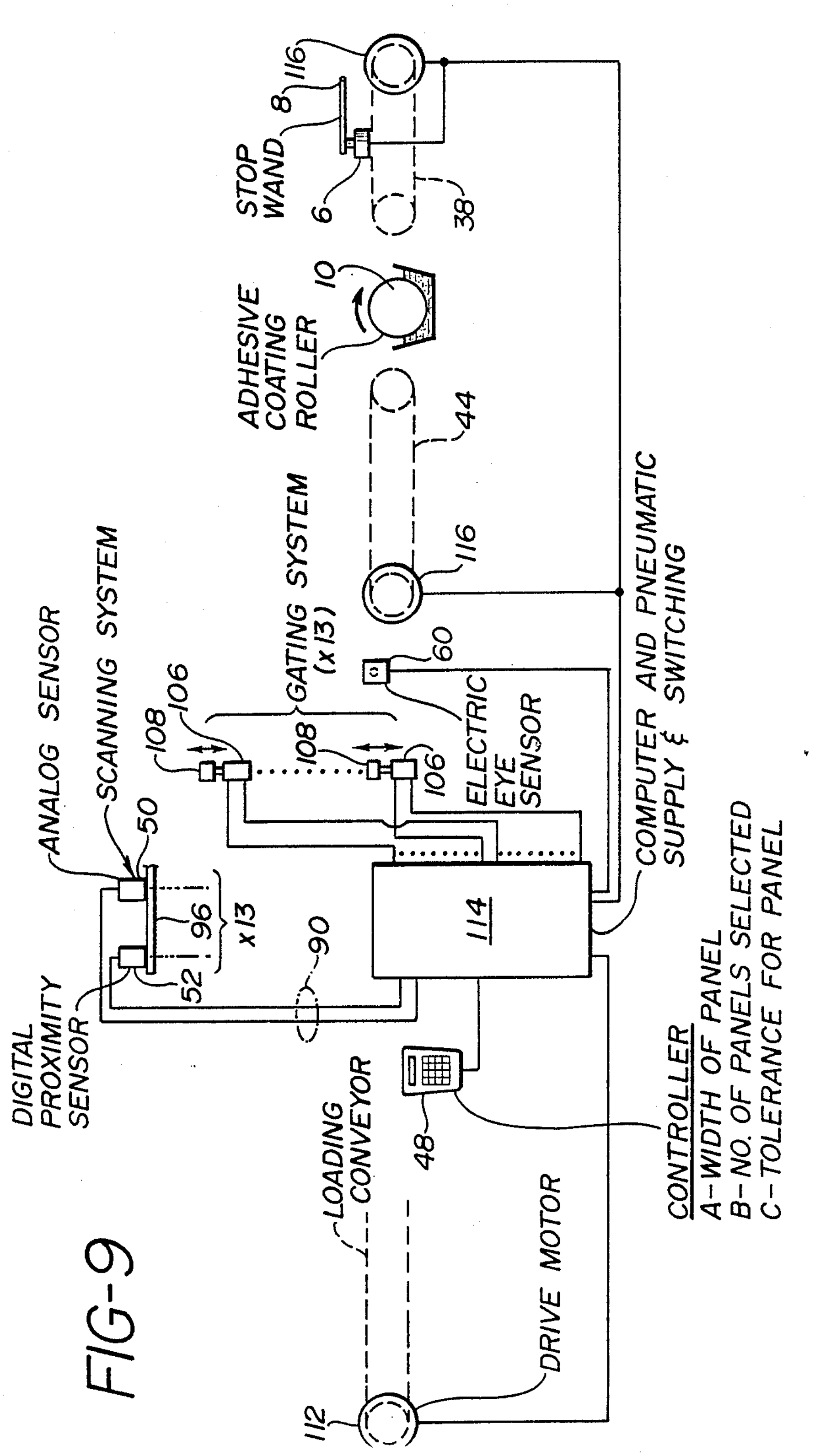
FIG. 9 is a diagrammatic view of the connections amongst the various subsystems in the invention.

FIG. 9 is a diagram which shows the electrical connections of the various elements previously described in connection with FIGS. 1–8. The apparatus employs several drive motors 112, 116 and 118. Motor 112 operates infeed section 2. Motor 116 controls the glue roller 10, the intermediate section roller rails 16 upstream of glue roller 10 and the rails 18 downstream of glue roller 10. Push button 46, described in connection with FIG. 1 above, causes the apparatus to start, stop and scan under control of the operator. The controller 48 permits the operator to select the width of the panel to be formed by the pieces, the number of pieces to be selected and the tolerance applicable to the selection. These signals are fed to computer 114. Computer 114 also receives as inputs, the outputs of digital proximity sensor 52 and analog sensor 50 from the scanning system. The computer 114 is also connected to receive the input of the electric eye sensor 60. The computer controls the gates 106, 108 to select the boards for passage to glue roller 10 until de-energized by stop wand 8 on mounting pivot 6.

The following table shows the manufacturer and model number of each of the elements of FIG. 9:

Computer 114—Wintek 6809 Control Computer
Controller 48—Quartic Systems QTERM-HR1
Electric eye sensor 60—Sanx NX-52M Beam Sensor
Digital proximity sensor 52—Microswitch 923AA4W-ATT-L
Analog sensor 50—Agastat PCU-A-30-M-30-AV
Gates 106,108—Bimba I91-D 1-1/16 bore ×1" stroke In practice, the number of thirteen different tracks from which the desired number of boards is to be selected was empirically derived. The number of boards required to make up a panel of the desired thickness could be more or less than thirteen depending on the variations in the output panel size desired and the size of the input stock from which the panel is to be formed.

With respect to maximum and minimum sizes, in operation, Applicant has found that the boards can vary in size from one inch to six inches in width (height when used in the apparatus).

The scanning section can select panels of any total width even wider than 13"×6". The selector accomplishes this by making a number of runs. For example, if a panel of 200" is desired, even though the apparatus provides only thirteen pieces of a maximum 6" height, three separate runs would be performed. On the first run, all the boards would be selected. On the second run, again all the boards would be selected. On the third run, the number of boards necessary to give a total number of 200" would be selected.

Figure 10:
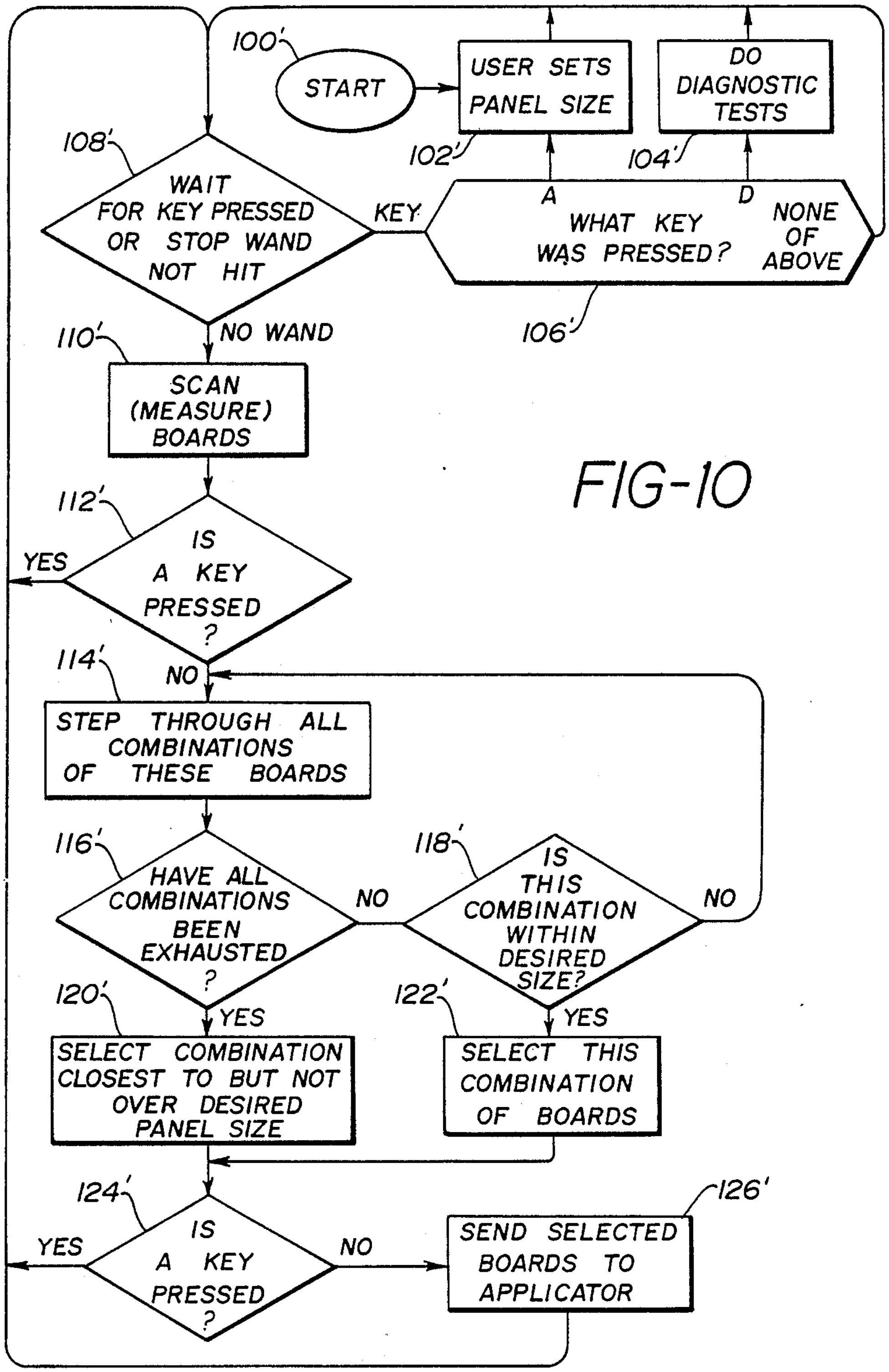
FIG. 10 is a flow chart for the computer program employed in the invention.

If the scanning cannot select boards within the desired tolerance (for example, 15" +or −1/32") then it selects the combination that is closest to and larger than the desired size. The flow chart for the program described below is shown in FIG. 10 hereof. The computer program for controlling the apparatus is set forth below.

The flow chart of FIG. 10 is presented to aid in understanding the operations described in the computer program listed above. In FIG. 10, numeral 100 denotes start of the flowchart. Numeral 102 denotes the settings formed by the user utilizing keyboard 48, described in connection with FIG. 9 above. Standard diagnostic tests performed on the computer operations are indicated at numeral 104 in FIG. 10.

Steps 106 and 108 in the flow chart indicates the lack of the indication that the apparatus should stop; namely, that no key on the controller 48 has been depressed or no indication that the stop wand 8 is in the position shown in FIG. 1.

The next function 110 is to scan the boards and again, in 112, sense that the master on/off key 46 is depressed. The boards are selected through the combination of functions 114, 116, 118, 120 and 122. Again, the sensing of master switch 46 is indicated in block 124. The boards are then sent to glue applicator, as indicated at 126 in FIG. 10.

The equations for selection of which of the thirteen boards will be selected for further processing will be described below.

In the equations following, the following applies:

$V_1=6''$ reference left (or right); $V_2=1''$ reference left; $V_3=1''$ reference right; $V_n$=a selected workpiece; $d_n$=the distance to the workpiece selected (i.e. $V_n$); and $d_3$=distance between $V_2$ and $V_3$.

Calibration from far left to far right (or vice versa) is represented by the following equation:

$$g_1 = \frac{d_n}{d_3}(V_3 - V_2) + V_n$$

The above equation is designed to calibrate the height above the boards of the analog sensor and the digital sensor. The calibration equation above recognizes that the height may be uneven from one far end support to the other. More specifically, and with reference to FIG. 5 for example, the height of the scanning support 98,96 as mounted on rodless cylinder 24 and supported by vertical supports 86,88 may not be uniform from one end to the other. Thus, the 6" references and the 1" references are used in the program to develop the calibration signal $g_1$ and $g_6$ representative of any difference in height of the mounting of the analog scanner. More specifically, if the analog electrical signal $V_3$ is greater than $V_2$ then a calibration signal $g_1$ is generated in lines "$g_1$" and "$g_6$" of the computer program described infra. The signal is generated for the board located at a location $D_n$ corresponding to the voltage $V_n$. In this manner, the computer program generates a correction signal for each board location representative of the height differential between the two references, $V_3$ and $V_2$.

The height calibration is developed in the equation which follows. In this equation, the difference between the 1" reference and the 6" reference is utilized to establish in the program calibration of each of the locations $g_1$.

The height calibration is represented by the following equation:

$$\text{Height} = 1 + 5\frac{(V_1 - V_2)}{V_1 - V_2}$$

My invention recognizes that there are several alternatives to approaching computer analysis of a multiplicity of different sized boards so as to determine which of the boards make up the desired width panel.

One way to size the panels is to go through the signals representative of the size of each board and adding up the sizes, comparing them to the desired size and going immediately to the next line if the combination size exceeds the maximum allowable panel size. This approach involves the necessity to perform calculations on every combination of panels.

Another method which may be employed is to take the first n (say 5) boards such that the total size is over the desired panel width. Then, from this combination of the first n boards over the panel width, combinations of boards are subtracted from the total size to get a result of the proper size. The advantage in this method is that you are taking combinations of boards at a time so that a more rapid process is involved in reaching the combination of the desired size.

One of the problems in working with this approach is that combinations of boards are repeated. For example, if in this approach eight boards are being examined subtracting one, two, three at a time and no combination is found, the approach must look at nine boards so that any combination that subtracts the ninth board involves simply a repeat of one of the combinations tried when looking at eight boards.

The approach employed in the present program involves minimization of repeats. Lines "make a panel" through "can't find within tolerance" of the program described infra control the selection process such that, for example if nine boards are being tried, the program avoids any combination that subtracts the ninth board (as this was already accomplished in analysis of eight boards). Further, if a combination of ten boards is being analyzed, the program does not calculate any combination based on subtraction of board number ten.

In establishing the methods above, the determinations were based on a test of sizing panels 12" to 30" wide on a machine with thirteen slots and board sizes ranging from 1" to 3".

Obviously, depending upon other numbers of boards, panel sizes, and combinations, other differing methods may be employed.

While a specific embodiment of this invention is described as is shown herein, it is to be understood that other embodiments may be resorted to without departing from the spirit and scope of the invention.

I claim:

```
#include "psio.h"

int numslots,used[14],scandir;
int boardsize[14];
unsigned int outstatus;

main()
   {
   long minussize=20000; int tolerance=30; float getnumber();
   int numused,dummy,numpanels=3;
   char c;

   numslots=13;
   scandir=0;
   ioinit();
 again:
   cls();
   printl("V1.0\n     Ready\n");

   while (1==1)
      {
      if (sense(STARTBUTTON))
         {
         /* run conveyor until start button hit again */
         cls;printl("Running");
         outon(CONVEYOR);
         waitstart();
         outoff(CONVEYOR);
         while(sense(STARTBUTTON));
         for (dummy=1,c=0;(dummy<=numpanels !! !numpanels) && !c;++dummy)
            {
            cls();printl("\n   Panel # ");printint(dummy);
            c=makepanel(minussize,tolerance);
            }
         goto again;
         }
      if (ischar())
         {
         c=inchar();
         if (c=='A')
            minussize=getnumber("Enter Panel Size",2,3)*1000;
         if (c=='B')
            numpanels=getnumber("Enter Number\nof Panels",2,0);
         if (c=='C')
            tolerance=getnumber("Enter Tolerance",0,3)*1000;
         if (c=='D')
```

```
      /* perform diagnostic tests */
      diagnostics();
    goto again;
   }
int makepanel(sizeleft,tolerance)
/*** does all sizing and motion control to make one panel ***/
/*** returns 0 normally, 1 if stopped by start button     ***/

   long sizeleft;
   int tolerance;
   {
   extern int scandir,numslots,used[14],boardsize[14];
   int numused,dummy,zerocount,batches;
   long bestsize,totalsize;

   while (sizeleft>tolerance)
      {
again:
      zerocount=scanboards();
      if (zerocount==-2) return(1);
 calcagain:
      numused=sizepanel(sizeleft,tolerance);
      if (numused<=0)
         {
         if (zerocount>2)
            {
            /* Run conveyor forward for 2.5 seconds */
            outon(CONVEYOR);
            delay(2500);
            outoff(CONVEYOR);
            goto again;
            }
         /* Calculate best size and smallest */
         bestsize=0;
         for (dummy=1;dummy<=numslots;++dummy)
            {
            bestsize+=boardsize[dummy];
            }
         bestsize/=2;
         if (sizeleft>bestsize)
            {
            /* send sizeleft-bestsize or all, whichever's smaller */
            totalsize=0;
            numused=0;
            do {
               ++numused;
               used[numused]=numused;
               totalsize+=boardsize[numused];
               }
               while (totalsize<sizeleft-bestsize-1.5 && numused<numslots);
            }
         else
            {
            tolerance*=2;
            goto calcagain;
            }
         }
```

```
/* Send selected boards */
   for (dummy=1;dummy<=numused;++dummy)
      if (boardsize[used[dummy]]!=0)
         {
         if (scandir) outon(14-used[dummy]);
         else outon(used[dummy]);
         sizeleft-=boardsize[used[dummy]];
         }
   while (!sense(STOPWAND)); /* Wand is wired N.C. */
   outon(CONVEYOR);
   outon(APPLICATOR);
   while (!sense(EYE));
   delay(230);
   for (dummy=1;dummy<=numslots;++dummy)
      outoff(dummy);
   while (sense(EYE));
   outoff(CONVEYOR);
   if (sizeleft<=tolerance) delay(300);
   delay(100);
   outoff(APPLICATOR);
  }
return(0);
}
  int sizepanel(minussize,tolerance)
    /*** Sizes a panel to a width from minussize to minussize+tolerance
     *** Board sizes are passed in boardsize[14].
     *** Function returns number of boards used to make the panel,
     ***   or 0 = there aren't enough boards to make the panel,
     ***   or -1= can't find a combination of boards to make the panel.
     *** The numbers of the boards used are passed back in used[14].
     ***/

   int tolerance;
   long minussize;
   {
   extern int boardsize[14];
   extern int numslots,used[14];

   long plussize,totallength,length[14];
   int numboards,pointer[14],tries,x,y,dummy;
   register int level;

   plussize=minussize+tolerance;

   makeapanel:
      totallength=0;
      numboards=0;
      tries=0;
      while (totallength<minussize)
         {
         ++numboards;
         if (numboards>numslots) return(0);
         totallength+=boardsize[numboards];
         }
```

```
trytheseboards:
   level=0;
   length[0]=totallength;
   if (tries==0)
      (
      ++tries;
      pointer[0]=numboards+1;
      )
   else
      pointer[0]=numboards;

checksize:
   if (length[level]<minussize) goto downpoint;
   if (length[level]<=plussize)
      (
      dummy=0;
      y=1;
      pointer[0]=numboards+1;
      for (x=level;x>=0;--x)
         (
         while (y<pointer[x])
            used[++dummy]=y++;
         ++y;
         )
      return(dummy);
      )

uplevel:
   if (++level==numboards) goto downlevel;
      pointer[level]=pointer[level-1];

downpoint:
   if (--pointer[level]==0) goto downlevel;
   length[level]=length[level-1]-boardsize[pointer[level]];
   goto checksize;

downlevel:
   if (--level>0) goto downpoint;
   totallength+=boardsize[++numboards];
   if (numboards<=numslots) goto trytheseboards;

return(-1);
)
int scanboards()
   /* Quits and returns -2 if start button hit */
   /* Otherwise, number of unmeasureable panels is returned */
   (
   extern int scandir;
   extern int boardsize[14];
   int dummy,zerocount=0;
   float gage1,gage6,fargage1,fargage6,g1,g6,dumboard;
      /*** read values ***/
         scanstart();
         if (readsize()==-1) return(-2);
         if ((gage6=readsize())==-1) return(-2);
         if ((gage1=readsize())==-1) return(-2);
```

```
        for (dummy=1;dummy<=13;++dummy)
            if ((boardsize[dummy]=readsize())==-1) return(-2);
        if ((fargage1=readsize())==-1) return(-2);
        if ((fargage6=readsize())==-1) return(-2);
     /*** convert boardsize numbers to inches using ***/
     /*** gage blocks for auto calibration.        ***/
        for (dummy=1;dummy<=13;++dummy)
            {
            g1=((14-dummy)*gage1+dummy*fargage1)/14.0;
            g6=((14-dummy)*gage6+dummy*fargage6)/14.0;
            dumboard=1.0+5.0*((g1-boardsize[dummy])/(g1-g6));
            if (dumboard<.7)
                {
                boardsize[dummy]=0;
                ++zerocount;
                }
            else boardsize[dummy]=dumboard*1000;
            }
   return(zerocount);
   }


int readsize()
   /*** Returns the size (voltage) of one board.      ***/
   /*** or returns -1 if start button pushed (stop) ***/
   /*** This routine assumes the sensor is traversing ***/
   /*** Look for down slope, then min value, then up slope ***/
   {
   int minsize=32000,x,down=0,y=0,xmin=32000,thissense,lastsense=5;
  doagain:
   thissense=sense(DELIMETER);
   if (lastsense!=scandir || thissense==scandir)
     {
     if (sense(-STARTBUTTON))
        {
        scanstart();
        while (sense(STARTBUTTON));
        return(-1);
        }
     x=getadc();
     if (x<y) down=1;
     if (down==1 && x<xmin) xmin=x;
     if (down==1 && x>y) minsize=xmin; /* up slope: use xmin found */
     y=x;
     lastsense=thissense;
     goto doagain;
        }
      return(minsize);
      }


    #include "psio.h"

    diagnostics()
       /* Performs all diagnostic checks */
       {
```

```
extern int numslots,scandir,boardsize[14];
int dummy,d2,d3,d4;

cls();printl("\nDiag.\n\n");

/* Visual conveyor test */
printl(" Conveyor\n");
outon(CONVEYOR);
delay(2500);
outoff(CONVEYOR);
delay(300);

/* Visual test of cylinders */
printl(" Cylinders\n");
for (dummy=1;dummy<=numslots;++dummy)
   {
   outon(dummy);
   for (d2=1;d2<=15000;++d2);
   outoff(dummy);
   }


/* test traverse speed + delimeter counts */
travagain:
 printl("\n\n\n Traverse\n");
 dummy=sense(DELIMETER);
 scanstart();
 d3=0;
 for (d2=1;d2<=34;++d2)
    {
    while (dummy==sense(DELIMETER) && d3<6000)
       {
       ++d3;
       for (d4=1;d4<=100;++d4);
       }
    dummy=!dummy;
    }
 if (d3<1400 || d3>2000)
    {
    cls();
 if (d3>=6000)
    {
    printl("Not traversing\nor not sensing\ndelimeters:");
    }
 if (d3<1400)
    {
    printl("Slow traverse\ndown.  Then");
    }
 if (d3>2000 && d3<6000)
   {
   printl("Speed traverse\nup.  Then");
   }
    printl(" hit\nany button.");
   waitstart();
   cls();
   goto travagain;
```

```
    /* Test ultrasonic sensor adjustment */
 adjagain:
     for (dummy=1;dummy<=15000;++dummy);
    printl("\n\n\nUltrasonic\n");
    scanstart();
    readsize();
    dummy=readsize();
    d2=readsize();
    for (d4=1;d4<=14;++d4) d3=readsize();
    d4=readsize();
    if (dummy<100 || dummy>500 || d4<100 || d4>500 ||
        d2<3600 || d2>4000 || d3<3600 || d3>4000)
       {
       cls();
       printl("Turn ");
       if (dummy<100 || d4<100 || dummy==32000 || d4==32000)
          printl("zero screw\nout");
       else if (dummy>500 || d4>500)
          printl("zero screw\nin");
       else if (d2<3600)
          printl("span screw\nin");
       else
          printl("span screw\nout");
       printl(" 1/4 turn.\nThen hit any\nbutton.");
       waitstart();
       cls();
       goto adjagain;
       }

    /* Test gage block settings */
    cls();
    printl("Put 1\" blocks\nin first & last\nslots.  Then hit\nany button.");
 gageagain:
    waitstart();
    for (d3=1,dummy=0,d2=0;d3<=5;++d3)
       {
       outon(CONVEYOR);
       for (d4=1;d4<=15000;++d4);
       outoff(CONVEYOR);
       scanboards();
       if (scandir)
          {
          dummy+=boardsize[1];
          d2+=boardsize[numslots];
          }
       else
          {
          dummy+=boardsize[numslots];
          d2+=boardsize[1];
          }
       }
    dummy/=5;
    d2/=5;
    if (dummy<994 || dummy>1000 || d2<994 || d2>1000)
       {
       cls();
```

```
   if (dummy<994)
      printl("Move right gage\nblock down");
   else if (dummy>1000)
      printl("Move right gage\nblock up");
   else if (d2<994)
      printl("Move left gage\nblock down");
   else
      printl("Move left gage\nblock up");
      printl(" 1/8\nturn.  Then hit\nany button.");
      goto gageagain;
      }
   }

float getnumber(prompt,before,after)
   char *prompt;
   int before,after;
   {
   char stg[8];
   float number=0,c;
   int numchar=0,x;

   cls();
   printl(prompt);
   while(1)
      {
      /* print out number */
      printl("\0331\145"); /* set cursor position to 3rd line */
      for (x=0;x<=before+after-1;++x)
         {
         if (x==before) putchar('.');
         if (x< before+after-numchar) putchar('_');
         else putchar(stg[x+numchar-before-after]);
         }
      putchar('\010'); /* backspace */
      /* wait for character */
      c=inchar();
      if (c>'9' || c<'0') return(number);
      if (numchar<before+after)
         {
      stg[numchar++]=c;
      c-=48;
      for (x=1;x<=after;++x) c/=10.0;
      number=number*10.0+c;
         }
      }
   }
   int ioinit()
      /*** Initializes all io cards ***/
      {
      extern unsigned int outstatus;
      outstatus=~0;
      output(outstatus);
      clradc();
      clrsen();
      }
```

```
int sense(input)
   /*** returns a 0 or non 0 value depending on whether an ***/
   /*** input number input is on.                           ***/
   /*** If input is negative, It doesn't re-read input values ***/

   int input;
   {
   static int sen;

   if (input>0) sen=getsen();
   else         input=-input;
   return(!(sen & (0x01 << (input*2-1))));
   }

/*** Before using these routines, outstatus has to be declared as
 *** an extern unsigned int outstatus=~0. (set equal to all ones).
 ***/
int outon(num)
   /*** Turns on output number num ***/
   int num;
   {
   output(outstatus &= ~(0x01 << --num));
   }

int outoff(num)
   /*** Turn off output number num ***/
   int num;
   {
   output(outstatus |=(0x01 << --num));
   }

int printl(stg)
   char * stg;
   {
   int index=0;
   while (stg[index]!='\0')
      {
      putchar(stg[index]);
      ++index;
      }
   }
 int printint(num)
    int num;
    /* prints a positive integer (num) */
    {
    char stg[15],*ptr=stg+14;
    *ptr='\0'; /* end of string */
    do {
      *(--ptr)=48+num-(num/10)*10;
      num/=10;
      }
      while (num>0);
    printl(ptr);
    }

 int cls()
    {
```

```
printl("\033E");
delay(200);
}
  NAM ioa
  TTL 'io initializations'
  STL 'analog to digital converter initialization'
  INCL     'IOloc.h'

  PSCT
  GLOBAL clradc,getadc,clrsen,getsen,output,ischar,inchar,putchar
  EXTERN .LINK

***    clradc  -  resets the a to d converter
*      C calling:  integer=clradc();

clradc  LDAA    #$3E
        LDX     #$FA40
        LDAB    #$F0
        STAB    1,X
        STAA    2,X
        STAA    3,X

        CLRD           return (int) 0 with 'Z' set
        RTS

        SPC     5,15

***   getadc  -  returns value from a to d converter
*     C calling: integer=getadc();

getadc  LDX      #$FA40
        LDA      #0

        TST      0,X
        STA A    1,X      select channel
getadc2 LDA A    2,X
        BPL      getadc2  conversion not done yet
        LDA B    0,X
        LDA A    1,X      get data
        AND A    #$0F     mask off control bits

        TST A             set 'Z' bit

        RTS

        SPC     5,15

***    clrsen  -  resets the sensor board
*      C calling:  integer=clrsen();

clrsen  LDAA    #$04
        LDX     #$FA20
        STAA    1,X
        STAA    2,X
        STAA    3,X

        CLRD           return (int) 0 with 'Z' set
```

```
        SPC     5,15

*** getsen  -  returns value of sensor bits
*       C calling: integer=getsen();

getsen  LDX     #200
        LDA A   #$FF
        TAB
READ2   AND B   $FA20
        AND A   $FA21
        DEX
        BNE     READ2

        TST A           set 'Z' bit

        RTS

        SPC     5,15

*** output -sets output bits to that sent as a parameter
*     C calling: integer=output(unsignedint);

output  PULS    X       pull return address off the stack
        PULS    D       pull passed parameter off the stack
        STA B   $FA10   store passed parameter in data dir. register
        STA A   $FA11
        SUB D   #0      set 'Z' bit and pass parameter back

        JMP     0,X

        SPC     5,15

*** ischar - returns 0 if no character is waiting in RS-232 port,
*   otherwise returns a non zero value.  C calling: int=ischar();

ischar  LDA A   $F940   read the status register
        RORA            recieve data register full flag to "C"
        BCC     NONE    branch if no character waiting
        LDA D   #1      set returned value
        TST B           set z bit
        RTS
NONE    LDA D   #0
        TST B
        RTS

        SPC     5,15

*** inchar - returns ascii value of one character inputed from
*   the keyboard.  Does not echo.  C calling: int=inchar();

inchar  LDA B   $F940   read status register
        LSR B
        BCC inchar
        LDA B   $F941   get data
        AND B   #$7F    mask down to 7 bits
        LDA A   #0
        TST B           set Z bit
        RTS
```

```
        SPC     5,15
***     putchar - write 1 character
*
*            This routine is designed to be compatible with
*       the standard "putchar". It therefore changes a C
*       '\n' character into the sequence "line feed", "carriage
*       return".
**
**      C calling sequence:  putchar(c);
**
**               where: c = (char) character to be written
 putchar SUBA    #2       expect 2 parameter bytes,
        BEQ     putchr0
        JSR     .LINK

 *   Here we get the character into B.

 putchr0 LDB     3,S

 *   Next, we change a '\n' into the two character
 *   sequence '\n\r'.

        CMPB    #0Ah
        BNE     putchr1
        BSR     OUTCH      call assembly language routine
        LDB     #0Dh

 *   Here we output the character or the '\r' of the
 *   two character sequence above.

 putchr1 BSR     OUTCH

 *   Finally, we return the character we just wrote.
 *   Note that the character is below the return
 *   address on the stack so we can't use a simple
 *   RTS to return.

        PULS    X
        PULS    D          (AB) = parameter,
        SUBD    #0         set the 'Z' bit according
        JMP     0,X         to the returned value,

        SPC     5,15
***     OUTCH - Output 1 character to ACIA
*
*       ENTRY: (B) = ASCII value of character
*
*       EXIT: (B) = ASCII value
*
*       USES: CCR except 'C' bit

OUTCH   PSHS    A
        LDA     #2        mask for ACIASR
OUTCH1  BITA    ACIA1SR
        BEQ     OUTCH1
        STB     ACIA1DR send (B) to ACIA
```

```
        PULS    A
        RTS

        END
/* misc. routines */

#include "psio.h"

int waitstart()
   /* Waits for start button off, then on again, or a key is pressed */
   {
   while (sense(STARTBUTTON));
   while (ischar()) inchar();
   while (!(sense(STARTBUTTON) || ischar()));
   if (ischar()) inchar();
   }

int delay(time)
   /* Delays for time miliseconds */
   int time;
   {
   int dummy,d2;
   for (dummy=1;dummy<=time;++dummy)
      for (d2=1;d2<=30;++d2)
   }

int scanstart()
   /* Start scan cyl. traversing in opposite direction */
   {
   extern int scandir;
   scandir=!scandir;
   if (scandir) outon(SCANCYL);
   else         outoff(SCANCYL);
   }
#define DELIMETER    1  /* Slot delimeter is input #1  */
#define EYE          2  /* Electric eye is input #2    */
#define STARTBUTTON  3  /* Start button is input #3    */
#define STOPWAND     4  /* Stop wand is input #4       */

#define APPLICATOR  14 /* Applicator motor is output #14  */
#define CONVEYOR    15 /* Conveyor motor is output #15    */
#define SCANCYL     16 /* Scanning cylinder is output #16 */
```

1. Apparatus for selecting at least two workpieces from among a number of work pieces to be combined together for further processing into a panel comprising:
- infeed means for supporting and advancing a plurality of workpieces from a first station to a second station;
- means at said second station for inspecting said plurality of workpieces and developing electrical signals indicative of the height of each of said workpieces;
- means connected to receive said electrical signals for comparing said electrical signals with predetermined panel dimension requirements and for generating output signals as a result of said comparison;
- selection means mounted in proximity to said workpieces and coupled to receive said output signals for selecting at least two of said workpieces to form a panel in accordance with said dimension requirements; and
- conveying means mounted in proximity to said selection means for conveying said selected workpieces for panel formation.

2. Apparatus for automatically selecting a number of work pieces for further processing to combine said selected workpieces into an intermediate product of predetermined dimensions comprising:
- supply means for supplying a plurality of workpieces of different dimensions;
- signal generating means for generating electrical signals representative of the dimensions of said workpieces, said signal generating means including:
  - support means for said signal generating means connected to said supply means;
  - movable mounting means connected to said support means and to said signal generating means for conveying said signal generating means in proximity to said workpieces;
  - scanning means mounted on said movable mounting means for generating a first electrical signal indicative of a dimension of each of said workpieces and a second electrical signal identifying each of said workpieces; and
- means connected to said signal generating means for selecting at least one of said workpieces for further processing.

3. The apparatus of claim 2 wherein said supply means includes a plurality of separate tracks, each of said tracks being formed by a plurality of rails separating one track from the other; and rotating means mounted beneath said rails for advancing said work pieces within said rails.

4. The apparatus of claim 2 wherein said means for selecting at least one of said work pieces includes gating means operable in a first position to block passage of said work pieces and in a second position to permit passage of said work pieces; said gate means including a plurality of individually operable means each coupled to said signal generating means.

5. The apparatus of claim 4 further including means coupled to said means for receiving said work pieces on said gate means assuming said second position, said receiving means including means coupled to receive said work pieces to concentrate said work pieces; gluing means coupled to receive said work pieces after concentration thereof for applying glue to one surface of said work pieces; and means contacting said glued work pieces for stopping said apparatus on arrival of said glued work pieces at a predetermined location.

6. The apparatus of claim 5 wherein said stopping means includes a stop wand mounted for contacting said glued work pieces and for stopping said apparatus when said wand is in a first position and for permitting said apparatus to operate when said wand is in a second position, said wand being driven to said first position by the presence of work pieces contacting said wand.

7. The apparatus of claim 2 wherein said first electrical signal is an analog signal and said second electrical signal is a digital signal.

8. The apparatus of claim 1 further including means at said second station for inspecting said workpieces and developing an electrical signal indicative of the location of each of said workpieces.

9. The apparatus of claim 8 wherein said electrical signals indicative of the height of each of said workpieces are analog signals and the electrical signals indicative of the location of each of said workpieces are digital signals.

10. The apparatus of claim 1 wherein said inspecting means includes transporting means coupled to said electrical signal developing means for carrying said electrical signal developing means across said workpieces.

11. The apparatus of claim 1 further including calibrating means at said second station for generating a calibration reference signal indicative of height.

12. A method of selecting from a number of workpieces a lesser number of workpieces for further processing comprising the steps of:
- conveying said workpieces to be selected from the first station to the second station;
- scanning said workpieces at said second station to generating electrical signals representing height and location of each of said workpieces;
- comparing the signals generated with predetermined conditions representing the desired width of a final product; and
- comparing the electrical signals representing height and location of said workpieces with said predetermined conditions and selecting which of said workpieces will comprise said desired width of the final product.

13. A method for selecting at least two workpieces among a number of workpieces to be combined together for further processing to form a panel comprising:
- supporting and advancing a plurality of workpieces from a first station to a second station;
- inspecting said plurality of workpieces and developing electrical signals indicative of the height of each of said workpieces;
- comparing said electrical signals with predetermined panel dimension requirements and generating output signals as a result of said comparison;
- selecting at least two of said workpieces based on said output signals; and
- conveying said selected workpieces for further processing.

* * * * *